(12) United States Patent
Anderson et al.

(10) Patent No.: US 7,657,487 B2
(45) Date of Patent: Feb. 2, 2010

(54) APPARATUS AND METHOD FOR PROVIDING DATA STORAGE DEVICE SECURITY

(75) Inventors: Daryl E. Anderson, Corvallis, OR (US); David M. Kwasny, Corvallis, OR (US); Mitchell A. Abrams, Corvallis, OR (US); Andrew Van Brocklin, Corvallis, OR (US); Paul J. Mcclellan, Corvallis, OR (US); Tony S Cruz-Uribe, Corvallis, OR (US); Michael A. Pate, Corvallis, OR (US); Todd E. Walker, Corvallis, OR (US); Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1748 days.

(21) Appl. No.: 10/116,867

(22) Filed: Apr. 5, 2002

(65) Prior Publication Data

US 2003/0191952 A1    Oct. 9, 2003

(51) Int. Cl.
    *G06F 17/60* (2006.01)
(52) U.S. Cl. .............................. 705/50; 705/51; 713/182
(58) Field of Classification Search ................... 705/50, 705/51; 713/182
    See application file for complete search history.

(56) References Cited

U.S. PATENT DOCUMENTS

| | | | |
|---|---|---|---|
| 4,662,971 A * | 5/1987 | Adams | 156/270 |
| 5,671,202 A | 9/1997 | Brownstein et al. | |
| 6,034,930 A * | 3/2000 | Kitahara | 369/47.15 |
| 6,081,785 A | 6/2000 | Oshima et al. | |
| 6,111,953 A * | 8/2000 | Walker et al. | 380/51 |
| 6,539,380 B1 * | 3/2003 | Moran | 707/9 |
| 6,973,068 B2 * | 12/2005 | Inoue et al. | 370/338 |
| 7,194,957 B1 * | 3/2007 | Leon et al. | 101/485 |
| 2001/0020935 A1 * | 9/2001 | Gelbman | 345/173 |
| 2002/0174345 A1 * | 11/2002 | Patel | 713/186 |
| 2004/0057581 A1 * | 3/2004 | Rhoads | 380/59 |
| 2004/0226659 A1 * | 11/2004 | Denholm et al. | 156/556 |
| 2007/0095464 A1 * | 5/2007 | Denholm et al. | 156/256 |

FOREIGN PATENT DOCUMENTS

JP    409204444    * 8/1997

* cited by examiner

*Primary Examiner*—Pierre E Elisca

(57) ABSTRACT

A data storage device includes a data storage mechanism within which is stored a computing program. The data storage device also includes a surface used for labeling. The labeling includes machine readable security information. The data program requires machine reading of the security information before at least a portion of the program is run.

16 Claims, 7 Drawing Sheets

APPARATUS AND METHOD FOR PROVIDING DATA STORAGE DEVICE SECURITY

BACKGROUND OF THE INVENTION

Data storage devices such as optical storage disks and other optical storage media are increasingly being used to store digitized video, digitized music, digitized photographs, computer programs and other types of data. There are a large variety of types of data storage devices currently being used and others being developed. For example, among the currently most popular types of optical storage devices are compact disks (CD) and Digital Versatile Disks (DVD). CDs and DVDs can be in various formats such as read only memory (ROM), recordable (R), and read/write (RW).

Without some implementation of security, data stored on data storage devices can be freely copied and used. To discourage software copying, various types of low level security is used. For example, computer software sold on a disk may require a user to access a manual or a piece of paper on which a password key is printed. When software is loaded from the disk, the software prompts the user to type in the password key. Such security has the advantage of setting up some barriers to copying as well as being minimally burdensome to a user.

Security of the type described above is easily defeated by distributing a copy of the password key with a copy of data from the data storage device. Additionally, if the manual or piece of paper containing the password key is lost, this can significantly inconvenience a user.

U.S. Pat. No. 5,671,202 issued to Brownstein et al. and U.S. Pat. No. 6,081,785 issued to Oshima et al. disclose inscribing bar code symbols or other machine or human readable information over unused storage areas of a data storage surface of a compact disk.

SUMMARY OF THE INVENTION

In accordance with an embodiment of the present invention, a data storage device includes a data storage mechanism within which is stored a computing program. The data storage device also includes a surface used for labeling. The labeling includes machine readable security information. The data program requires machine reading of the security information before at least a portion of the program is run.

DETAILED DESCRIPTION OF THE PREFERRED EMBODIMENT

In various embodiments of the present invention, software security associated with data storage devices such as optical disks, for example CDs and DVDs is enhanced by placing machine readable security information on the label. This method of providing security can be automatic so a user is not required to memorize or otherwise store a password. The security information can be updateable, for example by re-recording the label or replacing the label.

Figure 1:
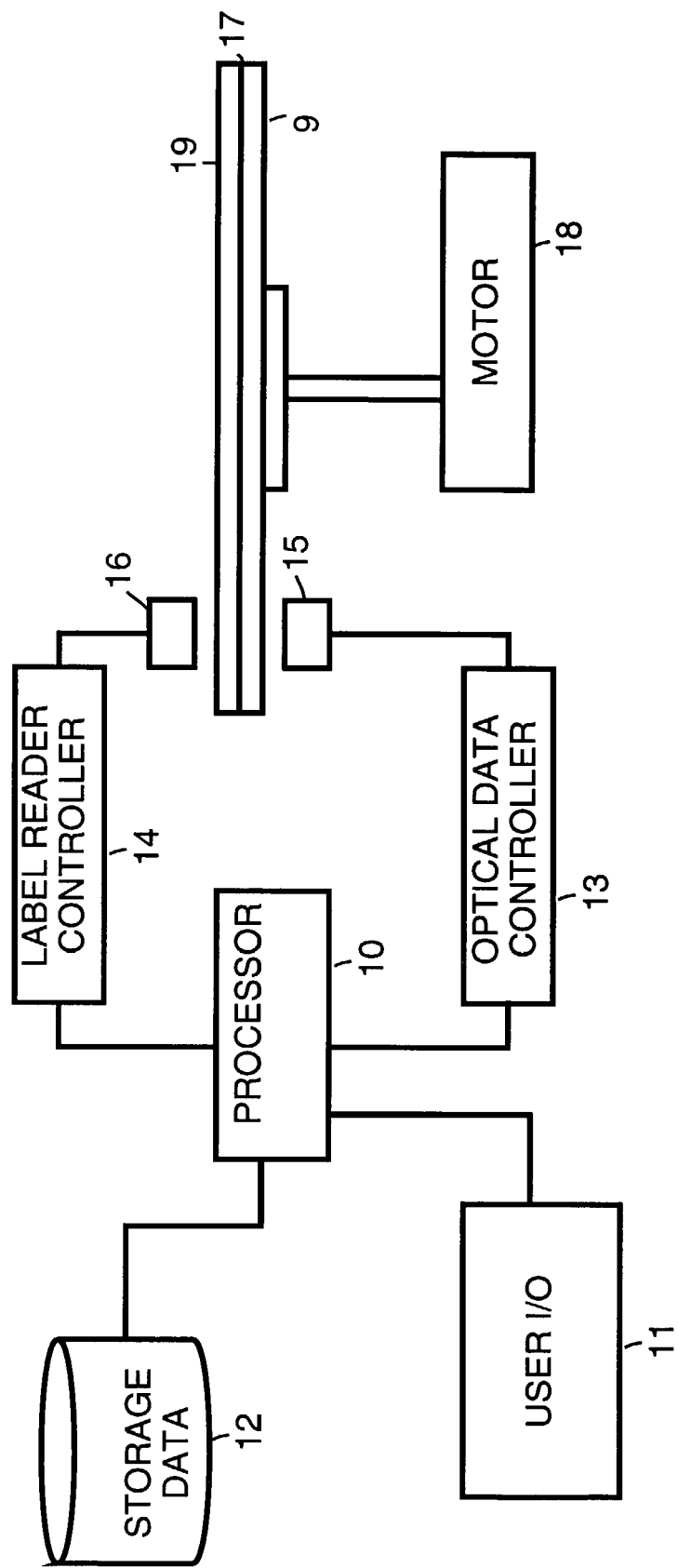
FIG. 1 is a simplified schematic diagram of a data security system in accordance with an embodiment of the present invention.

FIG. 1 is a simplified schematic diagram of a combined optical system that reads both data from a data storage device and information on a label on the data storage device. The system uses a head 15 to read data stored within a data storage device 17. The system uses a head 16 to read a label surface 19 of data storage device 17. For example, head 15 and head 16 both include lenses, optical detectors and optical sources such as photo diodes and lasers which perform illumination and optical detection. Data storage surface 9, for example, conforms to standards for CD-R, CD-RW, DVD-R, DVD-RW, DVD+RW, or some other disk storage format.

A motor 18 is part of a disk drive used to turn data storage device 17 during reading or writing. A processor 10 interfaces with an optical data controller 13, a label reader controller 14 data storage 12 and user input/output (I/O) 11.

In an alternative embodiment, both heads are on a same side of the data storage device. The label is read, for example by flipping the data storage device over so that the head has access to the label.

Figure 2:
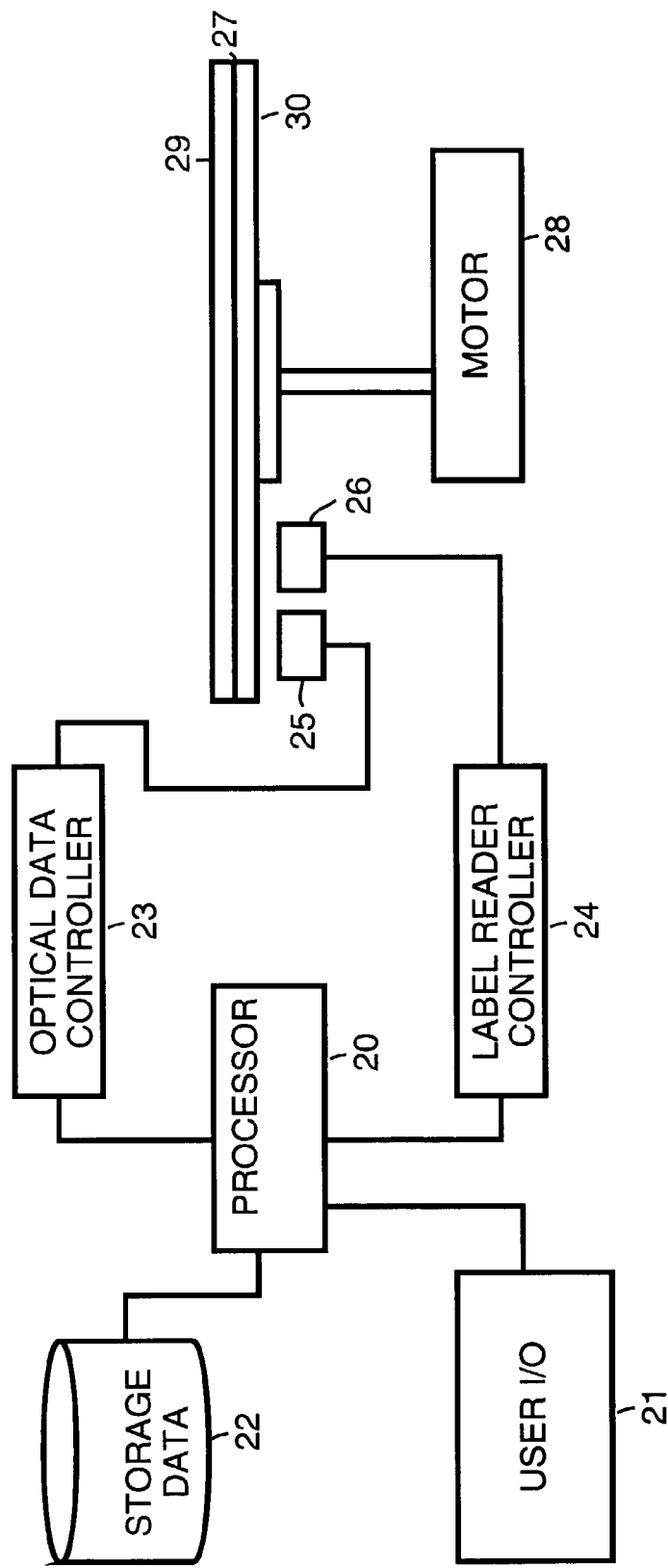
FIG. 2 is a simplified schematic diagram of a data security system in accordance with an alternative embodiment of the present invention.

For example, FIG. 2 is a simplified schematic diagram of a combined optical system that reads both data from a data storage device as well as a label on the data storage device. The system uses a head 25 to read data stored within the data storage device. The system uses a head 26 to read a label of the data storage device. Data storage surface 30, for example, conforms to standards for CD-R, CD-RW, DVD-R, DVD-RW, DVD+RW, or some other disk storage format. A surface 30 of data storage device 27 is used for labeling.

A motor 28 is part of a disk drive used to turn data storage device 27 during reading or writing. A processor 20 interfaces with an optical data controller 23, a label reader controller 24 data storage 22 and user input/output (I/O) 21.

In another alternative embodiment, a single head is used both to read data stored within the data storage device and to read a label of the data storage device. In this embodiment, head 25 and optical data controller 23 are used both to read data stored within the data storage device and to read a label of the data storage device. In this case, head 26 and label reader controller 24 are eliminated as being redundant and the optical hardware used to read the security information is identical or similar to current hardware used to read optical disks.

Figure 3:
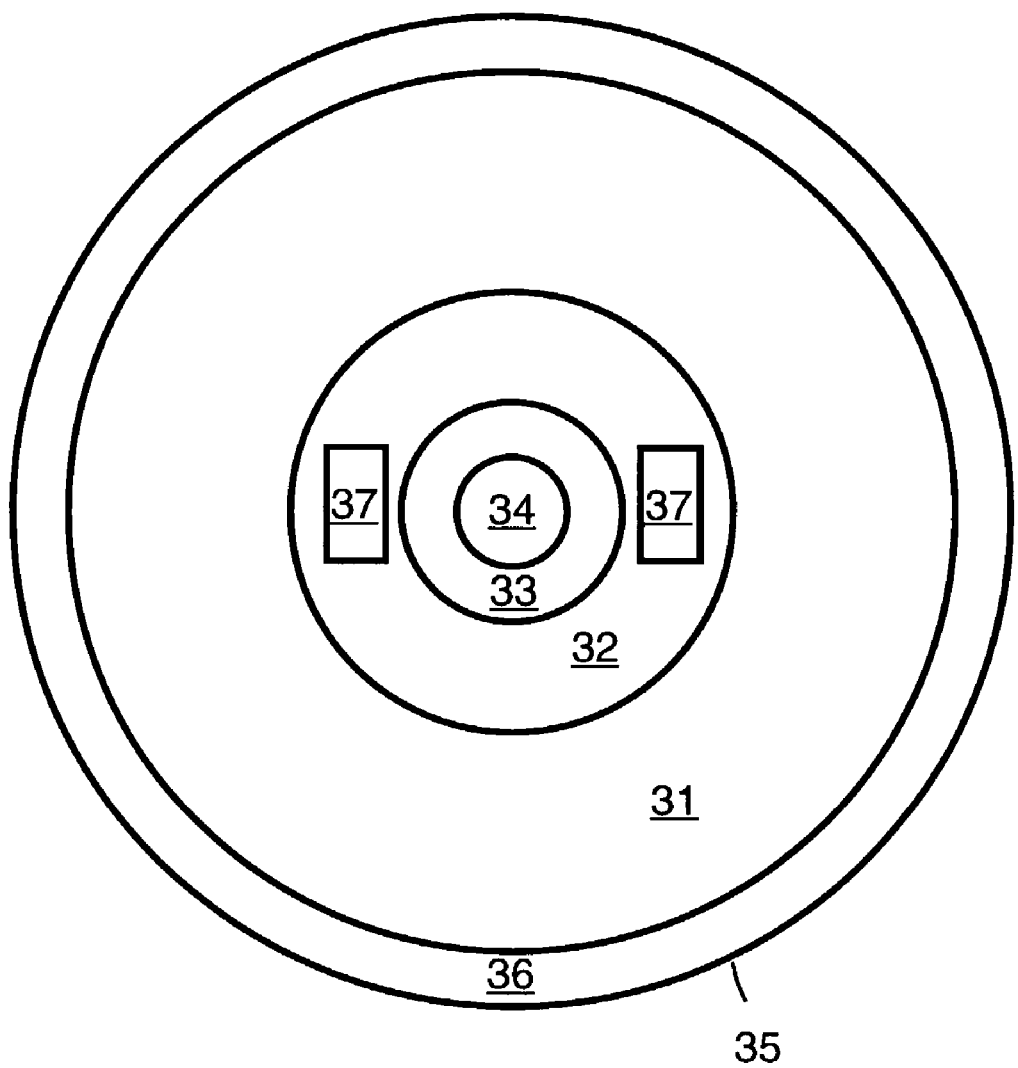
FIG. 3 shows separate labeling regions on the surface of a disk in accordance with an embodiment of the present invention.

Security information may be placed on the label in various places. For example, in FIG. 3, the labeling surface of a disk 35 includes a region 33 of bare substrate surrounding a hole 34. A region 31 is reserved for use by a manufacturer or user of the data storage device. A band 32 is used for security information. For example, security information is represented by boxes 37. Alternatively, a band 36 can be used to contain security information. Alternative layouts also can be used.

Figure 4:
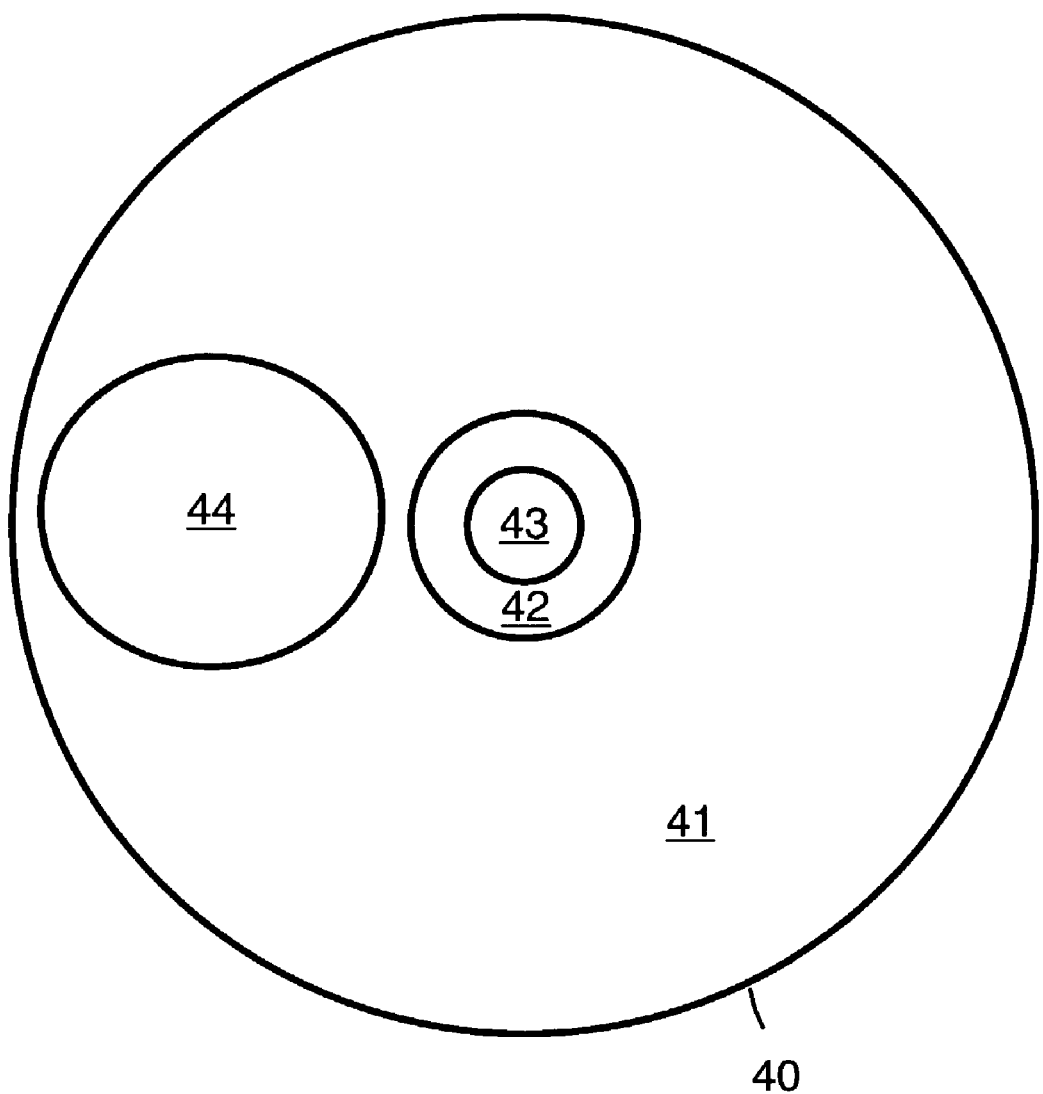
FIG. 4 shows separate labeling regions on the surface of a disk in accordance with an alternative embodiment of the present invention.

For example, FIG. 4 shows an alternative label layout. The labeling surface of a disk 40 includes a region 42 of bare substrate surrounding a hole 43. A region 41 is reserved for use by a manufacturer or user of the data storage device. A region 44 is used for security information.

Figure 5:
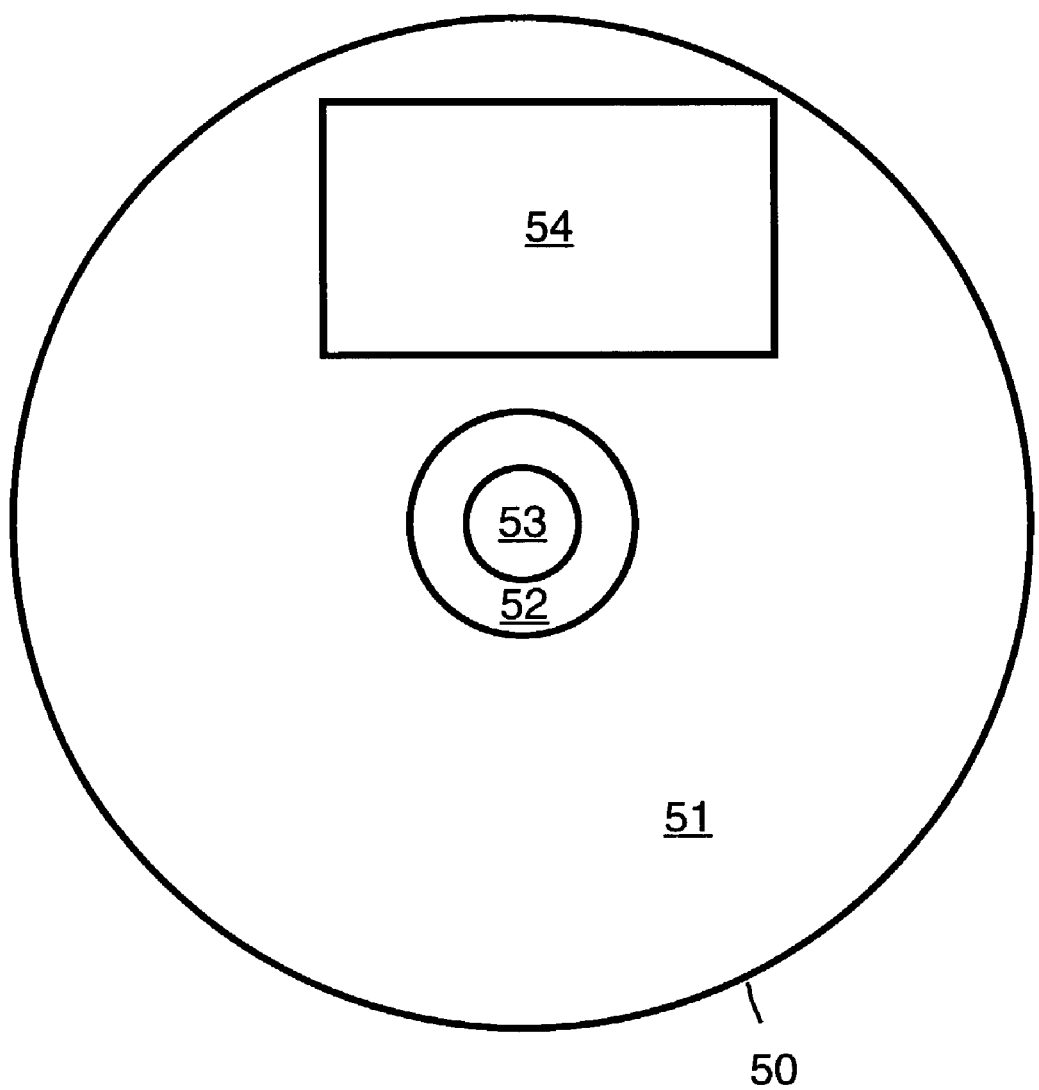
FIG. 5 shows separate labeling regions on the surface of a disk in accordance with an alternative embodiment of the present invention.

FIG. 5, shows another alternative label layout. The labeling surface of a disk 50 includes a region 52 of bare substrate surrounding a hole 53. A region 51 is reserved for use by a manufacturer or user of the data storage device. A region 54 is used for security information.

The security information is used, for example, to prevent unauthorized installation or startup of software stored on the data storage device. For example the security information can contain information or a pattern that must be detected before programs stored on the data storage device will run.

Figure 6:
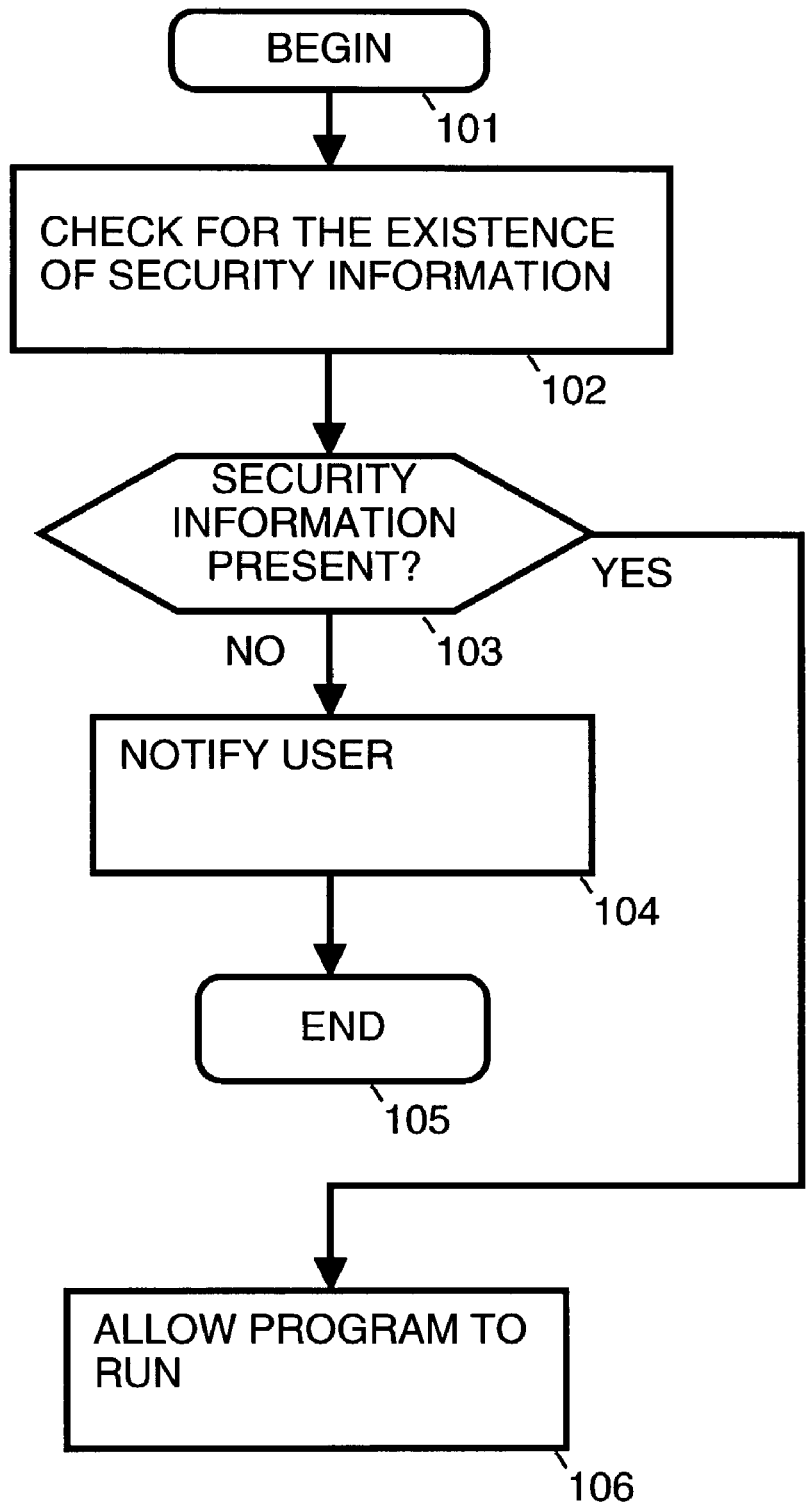
FIG. 6 is a simplified flowchart that illustrates using security information stored on a disk in accordance with an embodiment of the present invention.

This is illustrated by FIG. 6. In block 101, a program on the data storage device begins to run. In a block 102, the program checks for the existence of security information. This can be done without user intervention, provided the label is accessible to a reading device. If the label is not accessible to a readable device, the user can be given instructions to allow the label to be read. For example, the user is instructed to turn the data storage device over in the disk drive, or to place the label on a scanner.

After reading the label, in a block 103, the program determines whether the security information is present. This is done, for example by comparing the security information to see if it matches a serial number or other confirmation information stored within the program. If the security information is not present, in a block 104, the user is notified and in a block 105 the program is terminated. As an additional option, if the security information is not present, data on the data storage device is destroyed.

If the security information is present, in a block 106, the program is allowed to continue.

The security information can be placed on the label in a variety of formats. For example, the security information can be in the form of a bar code. Alternatively, the security information can be a watermark invisible to the user or security information can be a difficult to copy pattern. The security information also can be printed so small that the security information cannot be read with the naked eye or a typical scanner. For example, the security information can be written using the same resolution as the data pits on the data surface of the data storage device. The security information includes, for example, an encrypted serial number or password.

For example, when a bar code is used, preferred locations on the data storage device are either at the inside edge of the label area, or the outside edge. This simplifies hardware locating the bar code. For example, the bar code contains a serial number that is matched to a serial number embedded in the installation software on the data side of the data storage device.

When the security information is encoded as a bar code, it is convenient to use the same head for both scanning the label and reading the data in the data storage device. Each data storage device contains its own password, specific to that data storage device. Because the label is on a different surface than the data storage surface, data storage devices can be mass produced with identical data on each data storage device, while still having different passwords. Thus, for a large volume of optical disks, the data storage surface of the optical disks are identical while the labels can include different passwords. This provides both access protection to the optical disks and serves to allow each copy of the software to be trackable.

To increase security, the security information on the label can be concealed or encrypted. As discussed above, concealing can be accomplished by using marks made on the label that are invisible or undetectable by a naked human eye but are machine readable by the disk drive optics. The security information can be encrypted into a label or gray scale image. For example, the marks are encoded spatially or temporally, for instance, by using distances between lines to encode the security information. For example, the security information can be enciphered using monoalphabetic substitution, polyalphabetic substitution, random number substitution, matrix transposition, keyword based mixed alphabet, or message nulls and grouping. A user of the encrypted data storage device would need the key to use the data storage device or read data from the data side.

Alternative to the security information being provided by the manufacturer of the data storage device, the security information can also be obtained from the user. For example, the security information can be a password. Alternatively, the security information can be a temporary or permanent biometric image. The security information is stored on the label of the data storage device.

For example, photochromic material, thermochromic material or silver halide material on the label surface of a data storage device can create a visible image of a person's biometric information. The biometric information is, for example, an image of a thumbprint, an image of a palm print, an image of a face, an image of a retina or an image of an iris. This biometric information stored as part of a label is used to confirm whether future data storage device accesses are authorized. The materials that create the image can be permanent or temporary depending on the duration that access must be allowed or denied.

In some embodiments of the present invention, the security information can be update to monitor or limit use of the data storage device. For example, when it is desired to limit the number of times the data storage device is to be accessed, each time the data storage device is accessed, the security information is modified. For example, the security information is modified by adding a mark each time the data storage device is accessed. This allows the entity checking the security information to track how many times the data storage device has been accessed. When an access limit is reached, no more accesses are allowed to the data storage device.

Figure 7:
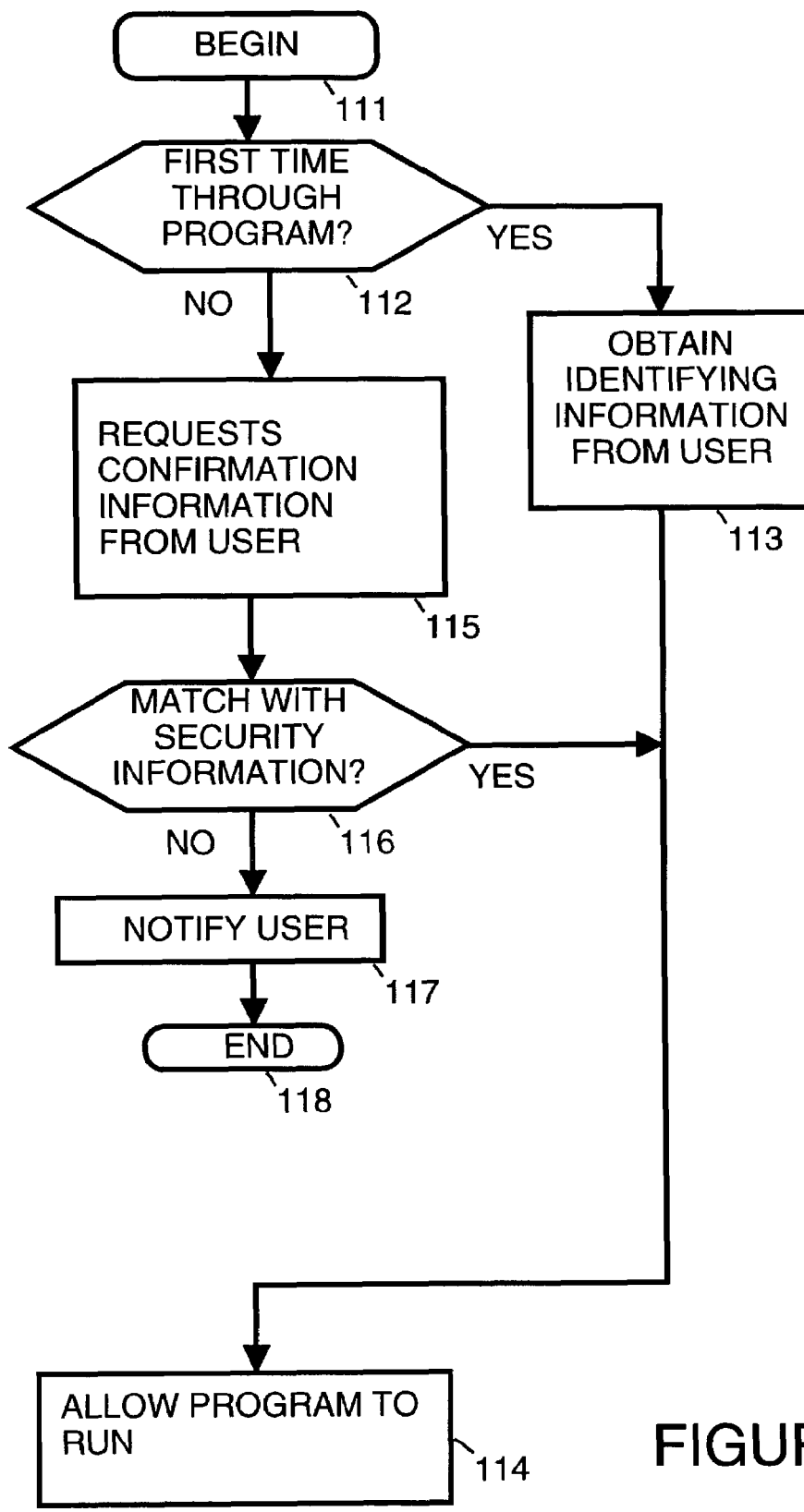
FIG. 7 is a simplified flowchart that illustrates using security information stored on a disk in accordance with another embodiment of the present invention.

FIG. 7 is a simplified flowchart that illustrates using user originated security information by a program within the data storage device. In block 111, a program on the data storage device begins to run. In a block 112, the program checks if this is the first time through the program. This is determined, for example, by checking to see whether there has been any security information previously obtained from a user and recorded on the label. If it is the first time through the program, in a step 113, the security information is obtained from the user. This is done, for example, by requesting the user to perform an action that records biometric information. For example, the biometric information is recorded on thermochromic or photochromic materials on the label.

Some thermochromic and photochromic materials fade over a known period of time. Use of such thermochromic or photochromic materials may make the security system time sensitive. Alternative to using thermochromic or photochromic materials to capture biometric information from the user, the user is instructed to capture an image of biometric information using a optical scanner, thermal camera, or other biometric device. The captured image is then stored, for example, by printing the image directly on a surface of the data storage device or onto an adhesive label that is added to a surface of the data storage device. In alternative embodiments, the security information can be a password entered by the user.

Once the program confirms that the identifying information has been obtained from the user and stored on the label surface of the data storage device, in a block 114, the program is allowed to continue.

If, in block 112, the program recognized that this is not the first time through the program, in a step 115, the program asks the user for confirmation information. For example, the user is instructed to capture an image of biometric information using a optical scanner, thermal camera, or other biometric device. If the security word is a password, the user is requested to enter the password. In a step 116, the computer compares the confirmation information obtained from the user with the security information stored in the label. This can be done without user intervention, provided the label is accessible to a reading device. If the label is not accessible to a readable device, the user can be given instructions to allow the label to be read. For example, the user could be instructed to turn the data storage device over in the disk drive, or to place the label on a scanner. If the confirmation information does not match the security information, in a block 117, the user is notified and in a block 118 the program is terminated. If the confirmation information does match the security information, in block 114, the program is allowed to continue.

In an alternative embodiment of the present invention, the security information obtained from a user includes both biometric information and a password. The password is used to encrypt the biometric information before storing the biometric information on the label. The confirmation information includes both the biometric and a password. The password is used as a decryption key to mathematically transform a confirmation biometric image obtained from the user.

When adhesive labels are impractical or undesirable, information confirmation information can be printed directly onto a prepared surface of the data storage device. For example, a labeling surface of the data storage device is coated with a laser-sensitive layer composed of, for example, thermochromic and/or photochromic materials. The coating is performed, for example by a spin-on, dry-roll process, or another type of process such as screen printing or inkjet printing.

For example, the labeling materials can be activated by a laser. For example, the thermochromic materials are colorant materials such as the ones used in thermal papers, that, when passed through an imaging device with precise measures of heat applied by the print head, undergo a reaction that creates an image on the label material. In "direct" thermography a visible image pattern is formed by local heating of a recording material containing matter that by chemical or physical process changes optical or physical properties such as color, optical density or reflectivity. On heating to a certain conversion temperature, an irreversible chemical reaction takes place and a colored image is produced.

For simple text or grayscale imaging, essentially the same chemicals used in thermal fax paper can be used. For example, the production of a silver metal image on thermal fax paper is by means of a thermally induced on-reduction reaction of a silver soap with a reducing agent. Alternatively, suitable heat-sensitive dyes can be used, such as dyes which undergo decomposition and hence a visible and permanent color change when exposed to a desired temperature. Typical examples of such dyes available and known in the art are Basic Green 4, commercially available as Victoria Green from Keystone Aniline Corp., and Solvent Yellow 56, commercially available as Sudan Yellow 150, from BASF Wyandotte Corp.

Other examples of heat sensitive dyes incorporated into inks that can be used include Chemithermal CFBK90 (white to black), Chemithermal CFBK120 (white to black), Chemithermal CFBE90 (white to blue), and Chemithermal CFBE 120 (white to blue). Chemithermal CFBK 90 and Chemithermal. Each of the above inks are manufactured by Sherwood Technology Ltd. Another example of heat-sensitive inks are Permanent Temp Tell Ink in Yellow, Red, Blue, Green, Orange, Purple and Black manufactured by International Ink Company.

For more information on producing labels, see commonly assigned U.S. patent application Ser. No. 09/976,877 filed Oct. 11, 2001, entitled INTEGRATED CD/DVD RECORDING AND LABELING which is herein incorporated by reference.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A data storage device comprising:

a data storage mechanism within which is stored a computing program, the data storage mechanism having a surface used for labeling, the labeling including machine readable security information, the security information being based on first information obtained from a user during a prior use of the computing program;

wherein the computing program requires the first information to be obtained again during a subsequent use of the computing program and requires machine reading of the security information for verification of the first information before at least a portion of the computing program is run, and wherein the first information is biometric information obtained from the user and includes at least one of the following:
a fingerprint;
a palm print;
a facial image;
a retina image;
an iris image.

2. A data storage device as in claim 1 wherein the security information is a bar code.

3. A data storage device as in claim 1 wherein the security information is encrypted information.

4. A data storage device as in claim 1 wherein the security information is one of the following:
an encrypted serial number;
an encrypted password.

5. A data storage device as in claim 1 wherein the security information is encrypted using at least one of the following techniques:
monoalphabetic substitution;
polyalphabetic substitution;
random number substitution;
matrix transposition;
keyword based mixed alphabet;
message nulls and grouping;
spatial encoding;
temporal encoding.

6. A data storage device as in claim 1 wherein the labeling is performed onto an adhesive label attached to the data storage device.

7. A data storage device as in claim 1 wherein the labeling is performed onto labeling material adhering to the surface used for labeling.

8. A data storage device as in claim 1 wherein the labeling is performed onto material adhering to the surface used for labeling, the material being one of the following types:
- photochromic;
- thermochromic;
- silver halide.

9. A data storage device as in claim 1 wherein the portion of the computing program not allowed to run without machine reading of the security information includes an installation routine that installs programs and data on a computing system.

10. A data storage device as in claim 1 wherein the data storage device is one of the following:
- a compact disk read only memory storage device; a compact disk recordable storage device;
- a digital versatile disk read/write storage device;
- a digital versatile disk read only memory storage device;
- a digital versatile disk recordable storage device;
- a digital versatile disk read/write storage device.

11. A method for providing security to a data storage device, the method comprising:
- storing a program within the data storage device;
- placing machine readable security information on a surface of the data storage device that is used for labeling;
- requiring machine reading of the security information before at least a portion of the program is run;
- modifying the security information when the program is accessed, and,
- one or more of:
  - denying access to the portion of the program when the program has been accessed a predetermined number of times;
  - destroying information within the data storage device after a failure to verify that correct security information is on the surface of the data storage device that is used for labeling.

12. A method as in claim 11 wherein modifying the security information when the program is accessed allows monitoring a number of times the program is run.

13. A data storage device comprising:
- a data storage means to store a program;
- labeling means to display labeling information on a surface of the data storage device, the labeling information including machine readable security information, the security information being based on first information obtained from a user during a prior use of the program; and,
- security means to require machine reading of the security information before at least a portion of the program is allowed to be run on a computing system,
- wherein the first information is biometric information obtained from the user and includes at least one of the following:
  - a fingerprint;
  - a palm print;
  - a facial image;
  - a retina image;
  - an iris image.

14. A data storage device as in claim 13 wherein the security information is a bar code.

15. A data storage device as in claim 13 wherein the security information is encrypted information.

16. A data storage device as in claim 13 wherein the portion of the program not allowed to run without machine reading of the security information includes an installation routine that installs programs and data on the computing system.

* * * * *